United States Patent [19]

Zimmer

[11] Patent Number: 4,657,472
[45] Date of Patent: Apr. 14, 1987

[54] MANIPULATOR HEAD ASSEMBLY

[75] Inventor: Ernst Zimmer, Friedberg, Fed. Rep. of Germany

[73] Assignee: KUKA Schweissanlagen+Roboter GmbH, Augsburg, Fed. Rep. of Germany

[21] Appl. No.: 742,280

[22] Filed: Jun. 7, 1985

Related U.S. Application Data

[63] Continuation-in-part of Ser. No. 634,753, Jul. 26, 1984.

[30] Foreign Application Priority Data

Aug. 3, 1983 [DE] Fed. Rep. of Germany ....... 3328071
Aug. 3, 1984 [DE] Fed. Rep. of Germany ....... 3428748

[51] Int. Cl.$^4$ ............................................. B25J 17/02
[52] U.S. Cl. .................................... 414/735; 901/29; 901/26
[58] Field of Search ................. 901/25, 26, 28, 29, 901/42; 414/735

[56] References Cited

U.S. PATENT DOCUMENTS 3,922,930 12/1975 Fletcher et al. .................. 901/28 X
4,030,617 6/1977 Richter ............................. 901/42 X
4,402,234 9/1983 Malarz et al. ..................... 901/29 X

OTHER PUBLICATIONS

Literature "Harmonic Drive", 2 pages.

Primary Examiner—Terrance L. Siemens
Attorney, Agent, or Firm—Karl F. Ross; Herbert Dubno

[57] ABSTRACT

A head assembly for a manipulator has, as is known, an inner part, an intermediate part, and an outer part having a holder adapted to carry a tool. An inner pivot and drive unit rotates the inner part on the manipulator about an inner axis defined thereby. An intermediate pivot and drive unit rotates the intermediate part on the inner part about an intermediate axis defined by the inner part and intersecting the inner axis at an intermediate angle not equal to 90° and open away from the inner part. An outer pivot and drive unit rotates the outer part on the intermediate part about an outer axis defined by the intermediate part and intersecting the intermediate axis at a point and at an outer angle not equal to 180° and open away from the intermediate part. The outer drive and pivot unit includes a stepdown transmission in the intermediate part and normally also another such stepdown transmission in the inner part.

4 Claims, 6 Drawing Figures

MANIPULATOR HEAD ASSEMBLY

CROSS REFERENCE TO RELATED APPLICATION

This application is a continuation-in-part of copending patent application Ser. No. 634,753 filed July 26 1984.

FIELD OF THE INVENTION

The present invention relates to a manipulator head assembly. More particularly this invention concerns the tool-head of an industrial robot or manipulator.

BACKGROUND OF THE INVENTION

Copending patent application Ser. No. 587,929 filed Mar. 09 1984, describes a standard manipulator having a stationary base on which a carousel can be rotated about a vertical axis by a motor mounted on the base. A main support arm is pivotal on the carousel about an inner horizontal axis perpendicularly intersecting the vertical axis by means of another motor mounted on the carousel. A counterweight is provided for counterbalancing the offcenter weight of the main arm and the structure carried by it.

The upper end of the main arm carries an outrigger arm rotatable on the main arm about an outer horizontal axis by means of yet another motor carried on the main arm. The outer end of this outrigger arm in turn carries a so-called mechanical hand comprising a head rotatable about an inner head axis perpendicularly intersecting the outer outrigger-arm axis and carrying in its turn a tool holder rotatable on the head about an intermediate holder axis perpendicularly intersecting the head axis. This holder in turn can rotate a tool about an outer tool axis perpendicular to the holder axis. Drives are provided at the rear end of the outrigger arm for rotation about the various axes.

Thus, and as also described in German patent document No. 2,435,156 filed July 22 1974 by Hans Richter, such an arrangement has six different pivot axes—the vertical one between the base and carousel, the inner horizontal one between the inner arm end and the carousel, the outer horizontal one between the outer arm end and the outrigger, and the head, holder, and tool axes—so that the tool can assume virtually any necessary angle of attack relative to the workpiece. The three-shaft drive for the tool head, as described in German patent document No. 2,402,829 filed by T. Ono et al based on a Japanese application filed Jan. 25 1973, uses three concentric drive shafts for the inner, intermediate, and outer head-assembly axes to ape the motions of a hand and wrist.

As further described in German patent document No. 2,619,336 filed by P. Pardo et al with a claim to a French priority of May 15 1975, such arrangements have the disadvantage that, for instance, to bring the tool into a position at a right angle to the inner head it is necessary first to rotate the intermediate and inner parts, that is the head and holder, and then the intermediate and outer parts, that is the holder and tool, to achieve the desired orientation. It is therefore impossible to move the tool smoothly along a continuous arc.

Accordingly U.S. Pat. No. 4,068,536 issued Jan. 17 1978 and German patent document No. 2,927,485 filed July 07 1979 by K. Wilfinger et al, propose using nonperpendicular head-end axes, so that the inner and intermediate parts meet at an oblique plane. Thus the intermediate shaft extends at an angle to the parts to both sides of itself. All of the axes intersect to a point so that the outer tool axis is always perpendicular to a point on a spherical surface. Thus the tool can trace a smooth arc.

In all of these systems the outer pivot axis can be aligned with the axis on which the coaxial drive shafts are centered, so that in this position the program that operates the manipulator must decide whether to effect rotation of the tool about this axis either by rotation of just the tool, or of the tool and holder. This ambiguity can only be resolved by programming routines that complicate the system while conferring no particular benefit.

In the above-cited copending patent application an assembly is described having, as is known, an inner part, an intermediate part, and an outer part adapted to hold a tool. The inner part can rotate on the manipulator about an inner axis defined thereby whereas the intermediate part rotates on the inner part about an intermediate axis defined by the inner part and intersecting the inner axis at an acute intermediate angle open away from the inner part. The outer part rotates on the intermediate part about an outer axis defined by the intermediate part and intersecting the intermediate axis at a point offset from the inner axis and at an acute outer angle open away from the intermediate part. In no position of head assembly can any of the pivot axes—inner, intermediate, or outer—be coaxial with any of the other pivot axes.

Thus it is possible for the tool to be positioned at any angle with respect to any point in a fairly large space. As mentioned above, it is impossible for rotation of one part about its axis to cause the tool to move the same as some other rotation of the parts, so that there is no redundancy in axes at all. As a result the positioning program can work wholly mathematically, without deciding between several alternative ways of reaching the same position. As a result of this use of three nonredundant rotation axes, it is possible for a fairly large field to be reachable by the tool.

Although such an arrangement is a distinct improvement on the prior-art systems, it can still be improved upon.

OBJECTS OF THE INVENTION

It is therefore an object of the present invention to provide an improved manipulator head assembly that advances and improves on the principles laid out in the copending parent application.

Another object is the provision of such a manipulator head assembly which overcomes the above-given disadvantages, that is which does not have this positioning ambiguity, and that has a relatively large range of motion.

SUMMARY OF THE INVENTION

A head assembly for a manipulator according to this invention has, as is known, an inner part, an intermediate part, and an outer part having a holder adapted to carry a tool. An inner pivot and drive unit rotates the inner part on the manipulator about an inner axis defined thereby. An intermediate pivot and drive unit rotates the intermediate part on the inner part about an intermediate axis defined by the inner part and intersecting the inner axis at a intermediate angle not equal to 90° and open away from the inner part. An outer pivot and drive unit rotates the outer part on the intermediate part about an outer axis defined by the intermediate part and intersecting the intermediate axis at a point and at an outer angle not equal to 180° and open away from the intermediate part. The outer drive and pivot unit includes a stepdown transmission in the intermediate part and normally also another such stepdown transmission in the inner part.

As a result of the inclined rotation axis of the outer part relative to the middle part the overall range that the tool can be moved through is greatly augmented. Since the outer axis is not coaxial with the inner axis, redundancy in positioning is eliminated, that is at no time can motion of one of the parts about the respective axis move the tool identically to a motion of another of the parts about its axis.

According to another feature of this invention the point where the inner and intermediate axes intersect lies on the inner axis. Such an arrangement has the advantage of a simpler way of calculating the starting position for moving the tool along a path. In addition the center axis of the holder has a face perpendicular to the outer axis and normally carrying the tool at a position offset from this outer axis. The workpiece projects perpendicularly from the holder face so that it extends parallel to the inner axis and can be moved in an arc centered on the inner axis while remaining parallel thereto, which is very useful for many robot procedures. It is possible to provide the holder with a clamp that can hold the tool at any of a plurality of locations offset on the holder face.

According to another feature of this invention the intermediate part has a two-part housing and the intermediate and outer axes are offset radially of the inner axis.

The system of this invention is therefore very compact, since the stepdown transmission is provided at the furthest end of the drive train for a part, so that relatively small shafts and bearings can be used upstream along the drive train. The transmissions themselves can be of the extremely efficient differential type that is very small and accurate. Any modest increase in size caused by providing these stepdown transmissions in the head itself is more than outweighted by the extended range that makes it possible to swing the tool holder through up to 180° from the fully extended position of the assembly.

DESCRIPTION OF THE DRAWING

The above and other features and advantages will become more readily apparent from the following, reference being made to the accompanying drawing in which.

SPECIFIC DESCRIPTION

Figure 1:
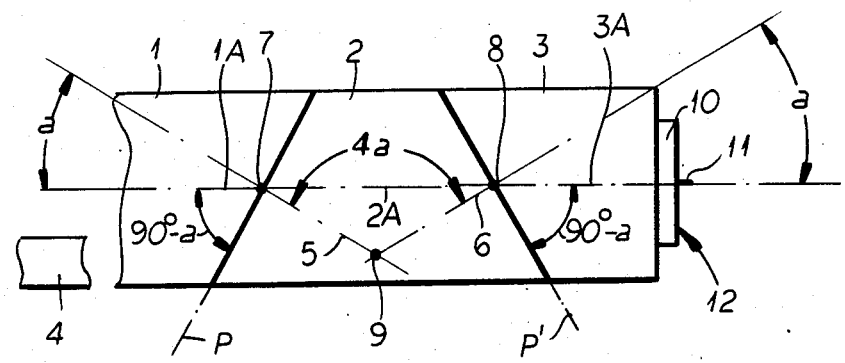
FIG. 1 is a mainly diagrammatic side view of a manipulator head assembly according to this invention in the coaxial position.

As seen in FIGS. 1 through 5 the head assembly according to this invention basically comprises inner, intermediate, and outer parts 1, 2, and 3 that are centered on respective axes 1A, 2A, and 3A and that abut each other flatly at planes P and P' that extend at an angle 4a of about 120° to each other. The part 1 is mounted on a support part or outrigger arm indicated schematically at 4 for pivoting thereon about its axis 1A. The part 2 pivots on the outer end of the part 1 about an axis 5 perpendicular to the plane P and intersecting the axis 1A on the plane P at a point 7. Similarly, the part 3 pivots on the outer end of the part 2 about an axis 6 perpendicular to the plane P' and intersecting the axis 2A on the plane P' at a point 8. The two axes 5 and 6 intersect at a point 9 offset from the axis 2A. As seen in FIG. 1, in the aligned or stretched position of the assembly the axes 1A, 2A, and 3A are coaxial and the axes 5, 6 form the sides and axis 2A the base of an isosceles triangle with an apex at point 9. The axes 5 and 6 extend in the FIG. 1 position at the angle a of 30° to the respective axes 1A and 3A, and the axes 4 and 6 extend at the obtuse angle 4a to each other, although they need not be symmetrical as illustrated. This angle 4a is decreased to increase the reach of the unit.

The outer part 3 is formed with a tool holder 12 having a cylindrical mount 10 on which is mounted a tool shown schematically at 11. This tool 11 can be a welding electrode, scribe, or the like.

With the system of this invention, therefore, rotation about the inner axis 1A, intermediate axis 5, or outer axis 6 will move the tool 11 in a manner wholly different from the type of movement produced by pivotal motion about the other axes, so that there are no situations where the movement of one part will be redundant.

Figure 2:
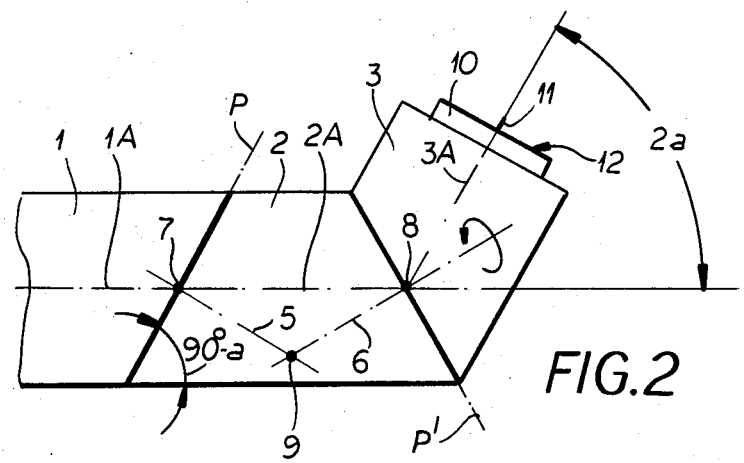
FIGS. 2, 3, 4, and 5 are diagrammatic side views of the manipulator head assembly in different flexed positions.
Figure 3:
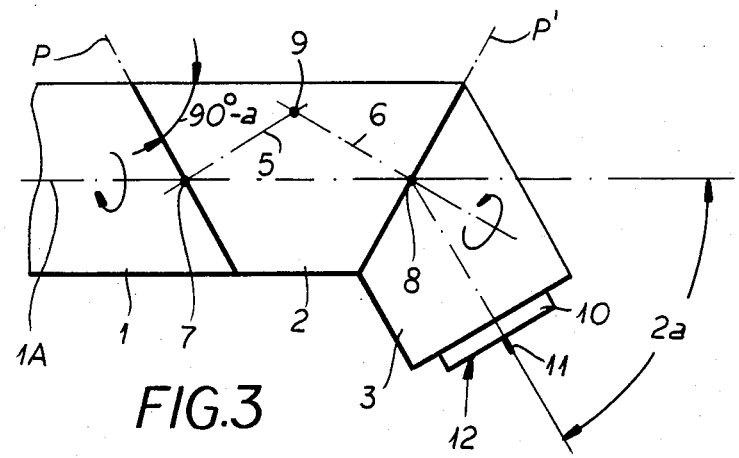

More specifically, when the outer part 3 is rotated through 180° about the axis 6 relative to the intermediate part 2 as shown in FIG. 2, the tool 11 will be swiveled in a spiral from a position aligned with the axis 2A to a position offset therefrom by the angle 2a. Once in this position it is possible as shown in FIG. 3 to rotate the part 1a relative to the arm 4 about the axis 1A and thereby rotate the tool 11 through a circular arc centered on the axis 2A. Obviously the radius of this arc can be changed by rotating the outer part 3 about the axis 6 through less than 180°.

Figure 4:
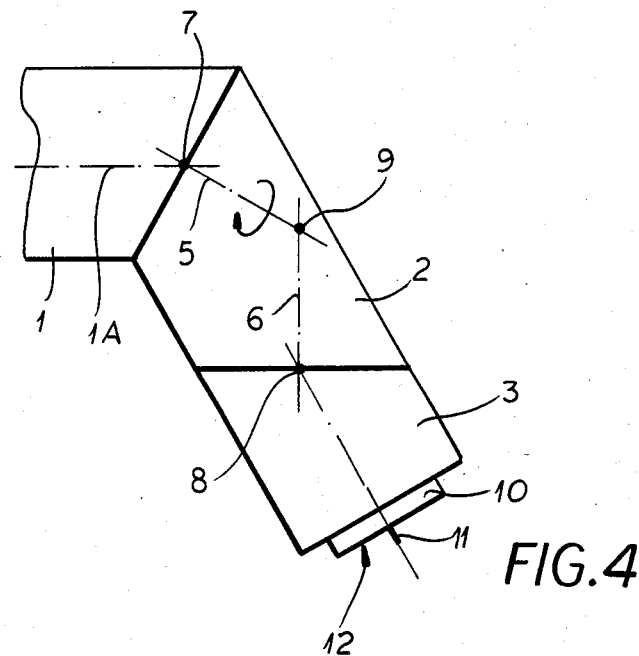

Similarly, as shown in FIG. 4, it is possible to rotate the parts 1 and 2 relative to each other through 180° about the axis 5, leaving the tool 11 offset relatively far from the axis 1A. Thus the system of this invention can move the tool 11 smoothly about virtually any diameter arc centered on a given point that is in fact traversed by the axis 1A.

Figure 5:
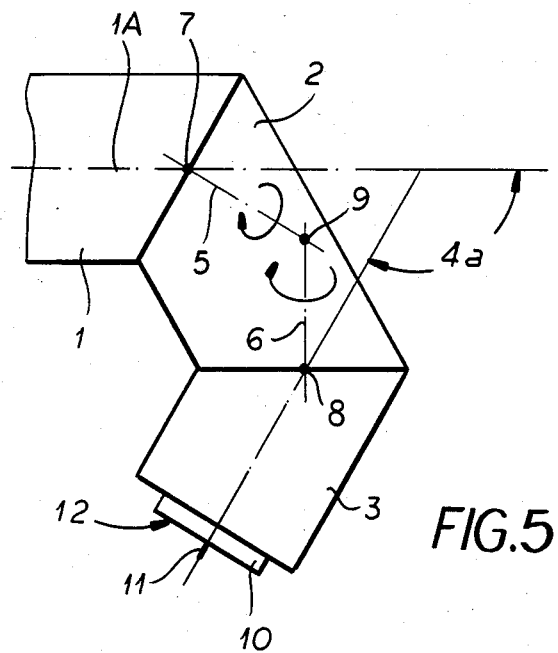

In addition as shown in FIG. 5, swivelling about both axes 6 and 7 pivots the tool 11 back through an angle 2a and even directs it back toward the underlying support arm 4.

The spatial calculations to set the tip of the tool 11 at any given point, normally with the tool axis 3A perpendicular to the workpiece, are simple. First the head assembly is of course moved by the carousel, main arm, and outrigger are so the axis 1A and point 7 are normally stationary at some desired distance from the workpiece. From this position rotation of the part 1 about the axis 1A relative to the arm 4 will establish the angular position of the point 9 while rotation of the part 2 about the axis 5 relative to the part 1 establishes the angular position of the point 8 relative to the point 9. Similarly rotation of the part 3 about the axis 6 on the part 2 will establish the angular position of the tool 11 relative to the point 8.

These calculations work back from the x, y, and z coordinates of the point of tool is supposed to be at, as well as the angles the axis 3A forms with this point, to the locus of the point 8. This establishes an imaginary circle in which the point 9 can lie, establishing in turn an imaginary toroid in which the point 7 can lie. Thus it is a fairly simple matter to put the tip of the tool 11 at any location within the relatively wide reach of the head assembly, a calculation that is not substantially complicated by also mandating that the axis 3A assume a certain position relative to the workpiece when the tip of the tool is at a desired location.

These spatial relationships remain clear and well within the scope of straightforward programming because at no time does rotation about any axis produce any motion that can be produced by rotation about any other axis. There being no redundancy, the calculation described above is a straightforward calculation since, assuming the axis 1A and point 7 are stationary, there is only one way the parts 1, 2, and 3 can be positioned relative to each other or to the arm 4 to position the point of the tool 11 on a given point within the head's reach.

Going further, any of these rotations of the parts about the three axes 1A, 5, and 6 can be compounded with another rotation about another of the axes at slower or faster speed to produce virtually any type of smooth arc drawn at any desired uniform or nonuniform speed. A linear path is nothing more than a succession of points defined as described above. Calculating linear movement is therefore also a straight-line affair, and establishing or varying travel speed is similarly easy. The head assembly can therefore be controlled accurately and reproducibly by a simple computer running a simple program to move the tool through any desired arc. This allows, for instance, a robot welder to trace and weld a complexly curved seam or to form a field of evenly spaced tack welds on a three-dimensionally warped surface.

Figure 6:
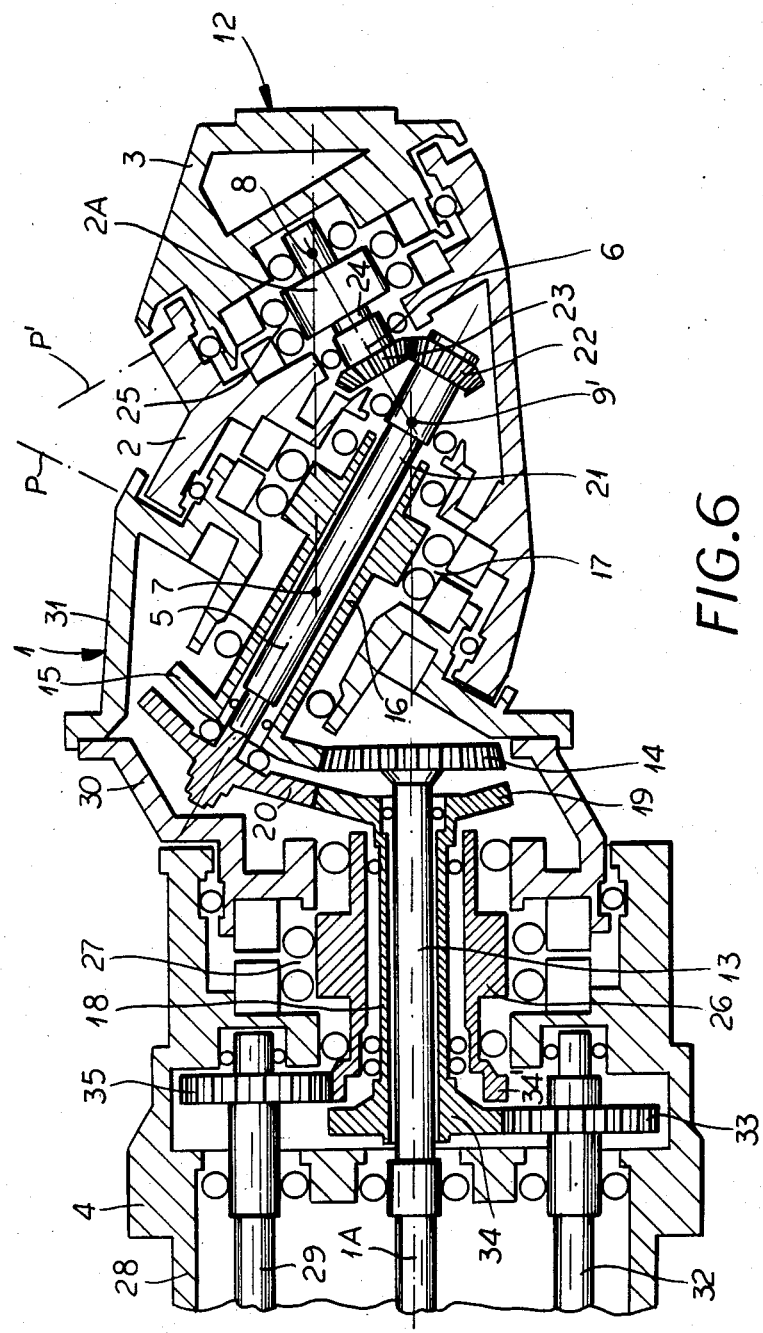
FIG. 6 is an axial section through another head assembly according to this invention.

FIG. 6 illustrates how a head assembly corresponding generally to the schematically illustrated head assembly of FIGS. 1 through 3 is actually constructed. In this arrangement the arm 4 has an outer end 28 provided at the axis 1A with a shaft 13 and with parallel shafts 29 and 32 diametrally flanking it. The shaft 13 has an outer end formed with a bevel gear 14 meshing with a bevel gear 15 carried on the inner end of a tube shaft 16 extending along the axis 7, journaled in the part 1, and having an outer end connected via a differential transmission 17 to the parts 1 and 2 at the joint at the plane P therebetween. Thus rotation of this shaft 13 causes the parts 1 and 2 to rotate relative to each other about the axis 5.

The shaft 32 has an outer end provided with a gear 33 meshing with a gear 34 carried on the inner end of a tube shaft 18 surrounding the shaft 13 and having an outer end provided with a bevel gear 19 meshing with a bevel gear 20 of a shaft 21 coaxially traversing and journaled in the shaft 15. The outer end of this shaft 21 carries another bevel gear 22 meshing with a bevel gear 23 on a shaft 24 centered on the axis 6 and connected via another differential transmission 25 to the two parts 2 and 3 at the joint at the plane P' therebetween. Thus rotation of the shaft 32 causes the parts 2 and 3 to rotate relative to each other about the axis 6.

Finally, th shaft 29 has an outer end provided with a gear 35 meshing with another gear 34 carried on a tube shaft 26 coaxially surrounding the shafts 13 and 18 and connected via a third differential transmission 27 to the parts 4 and 1. Thus the shaft 29 controls rotation of the part 1 about the axis 1A relative to the part 4.

The transmissions 17, 25, and 27 can be of the gear or belt type and can incorporate closable clutches and/or brakes. In this example the transmissions have inner elements that rotate with the respective shafts 21, 24, or 26 and outer elements that rotate with the respective parts 1, 2, 3, or 4.

In this arrangement, unlike that of FIGS. 1 through 5, the housing of the inner part 1 is formed of two flanged elements 30 and 31 that offset the axis 2A radially from the axis 1A so as to position the intersection 9' of the axes 5 and 6 on the axis 1A. The tool 11 can be moved along the holder 12 to be coaxial with the axis 1A, if desired. So long as the holder 12 is perpendicular to the axis 24 it is thus possible to move the tool 11 along pr parallel to the axis 1A which is of particular interest for those manipulators whose individual members are guided for movement in three dimensions.

I claim:

1. A head assembly for a manipulator, the assembly comprising:
   an inner part;
   inner pivot means for supporting the inner part on the manipulator for rotation about an inner axis fixed relative to the manipulator and extending through the inner part;
   an intermediate part;
   intermediate pivot means for supporting the intermediate part on the inner part for rotation about an intermediate axis defined by the inner part and intersecting the inner axis at an intermediate angle not equal to 90° and open away from the inner part;
   an outer part having a holder adapted to carry a tool;
   outer pivot means for supporting the outer part on the intermediate part for rotation about an outer axis fixed relative to the intermediate part, extending through the outer part, and intersecting the intermediate axis at an outer angle not equal to 180° and open away from the intermediate part;
   inner drive means for rotating the inner part on the manipulator about the inner axis defined thereby;
   intermediate drive means for rotating the intermediate part on the inner part about the intermediate axis and including
      an inner core shaft on the inner axis and having an outer end provided with a bevel gear, an intermediate tube shaft extending along the intermediate axis,
      an inner bevel gear on the intermediate tube shaft and meshing with the gear of the inner core shaft, and
      a harmonic stepdown transmission connected between the intermediate tube shaft and the intermediate part for relatively slow rotation of the intermediate part relative to the intermediate tube shaft; and
   outer drive means for rotating the outer part on the intermediate part about the outer axis and including
      an outer shaft extending along the outer axis,
      a bevel gear on the outer shaft,
      an intermediate core shaft in the intermediate tube shaft and carrying an outer bevel gear centered on the intermediate axis and meshing with the bevel gear of the outer shaft for rotating the outer shaft in the outer part about the outer axis and an inner bevel gear also centered on the intermediate axis, an inner tube shaft coaxially surrounding the inner core shaft and having an outer end provided with a bevel gear meshing with the inner bevel gear of the intermediate core shaft, and a harmonic stepdown transmission connected between the outer shaft and the outer part for relatively slow rotation of the outer part relative to the outer shaft.

2. The manipulator head assembly defined in claim 1 wherein the inner part has a housing offset on the manipulator radially of the inner axis.

3. The manipulator head assembly defined in claim 1 wherein the inner and intermediate parts meet at a joint defining with the inner and intermediate axes an inner swivel plane substantially perpendicular to the intermediate axis.

4. The manipulator head assembly defined in claim 3 wherein the outer and intermediate parts meet at a joint lying in an outer plane defining with the outer and intermediate axes an outer swivel plane substantially perpendicular to the intermediate axis and meeting the inner plant at an obtuse angle.

* * * * *